(12) United States Patent
Kim et al.

(10) Patent No.: US 8,274,805 B2
(45) Date of Patent: Sep. 25, 2012

(54) HIGH VOLTAGE POWER SUPPLY

(75) Inventors: Jin Wook Kim, Seoul (KR); Sug Chin Sakong, Seoul (KR); Sung Soo Hong, Gyunggi-do (KR); Sang Kyoo Han, Daejeon (KR); Chung Wook Roh, Seoul (KR); Jong Sun Kim, Gyunggi-do (KR); Dong Seong Oh, Incheon (KR); Jae Sun Won, Gyunggi-do (KR); Jong Hae Kim, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 291 days.

(21) Appl. No.: 12/258,564

(22) Filed: Oct. 27, 2008

(65) Prior Publication Data

US 2009/0251120 A1    Oct. 8, 2009

(30) Foreign Application Priority Data

Apr. 8, 2008 (KR) .................. 10-2008-0032640
Apr. 22, 2008 (KR) .................. 10-2008-0037297

(51) Int. Cl.
*H02M 3/18* (2006.01)
*G05F 1/62* (2006.01)

(52) U.S. Cl. .................. 363/59; 323/222; 307/110

(58) Field of Classification Search .................. 363/16, 363/21.01, 21.04, 21.08, 21.12, 21.16, 59, 363/60, 61, 126; 307/110; 323/266, 222, 323/232

See application file for complete search history.

(56) References Cited

U.S. PATENT DOCUMENTS

| 3,828,239 | A | * | 8/1974 | Nagai et al. ............ 363/20 |
| 3,967,159 | A | * | 6/1976 | Dendy et al. .......... 315/247 |
| 4,028,596 | A | * | 6/1977 | Weber ................. 361/235 |
| 4,380,044 | A | * | 4/1983 | Parr .................. 363/21.17 |
| 5,701,238 | A | * | 12/1997 | Weidinger et al. ...... 363/21.07 |
| 6,107,560 | A | | 8/2000 | Takehara et al. |
| 7,088,080 | B2 | * | 8/2006 | Kameda et al. ........ 323/222 |
| 2007/0210782 | A1 | | 9/2007 | Prexl et al. |

FOREIGN PATENT DOCUMENTS

| JP | 10113398 A | 5/1998 |
| JP | 2002-315312 A | 10/2002 |
| JP | 2003-259632 A | 9/2003 |
| KR | 1998-044509 A | 9/1998 |
| KR | 1020060001729 A | 1/2006 |

OTHER PUBLICATIONS

M. Prudente, et al. 'A Boost Converter with Voltage Multiplier Cells', IEEE Technical Paper, Jun. 2005, pp. 2716-2721.
Korean Office Action issued Jan. 11, 2010 for Korean Application No. 10-2008-0037297.

* cited by examiner

Primary Examiner — Gary L Laxton
(74) Attorney, Agent, or Firm — Lowe, Hauptman, Ham & Berner, LLP (57) ABSTRACT

There is provided a high voltage power supply capable of reducing voltage stress of a voltage multiplying device. The high voltage power supply includes: a power converter switching on/off and converting an input direct current power into a direct current power having a preset voltage level; and a voltage multiplier including a first multiplying cell multiplying the voltage level of the direct current power from the power converter, wherein the first multiplying cell includes: first and second capacitors charging the direct current power from the power converter, respectively; a first diode providing a path for transferring the direct current power when the power converter is switched off; and a second diode providing a path for transferring the direct current power when the power converter is switched on.

12 Claims, 10 Drawing Sheets

PRIOR ART

FIG. 9

HIGH VOLTAGE POWER SUPPLY

CROSS-REFERENCE TO RELATED APPLICATIONS

This application claims the priority of Korean Patent Application No. 2008-32640 filed on Apr. 8, 2008, and Korean Patent Application No. 2008-37297 filed on Apr. 22, 2008, in the Korean Intellectual Property Office, the disclosure of which is incorporated herein by reference.

BACKGROUND OF THE INVENTION

1. Field of the Invention

The present invention relates to a high voltage power supply, and more particularly, to a high voltage power supply capable of reducing voltage stress of a voltage multiplying device and supplying a voltage applied to an inductor as a bias voltage of a switching device according to a turn ratio without employing a power converting transformer.

2. Description of the Related Art

Recently, a high voltage power supply has found very broad applications in overall industrial fields and is being necessarily utilized in an increasing number of areas. This high voltage power supply is applied in various fields covering industrial purposes such as new material developments and plasma applications, civil purposes, medical appliances, A printer is easily accessible equipment at home or in the office and employs a high voltage power supply with stable multiple functions, which are most essential in forming an image. Also, there is an increasing demand for such a high voltage power supply.

Figure 1:
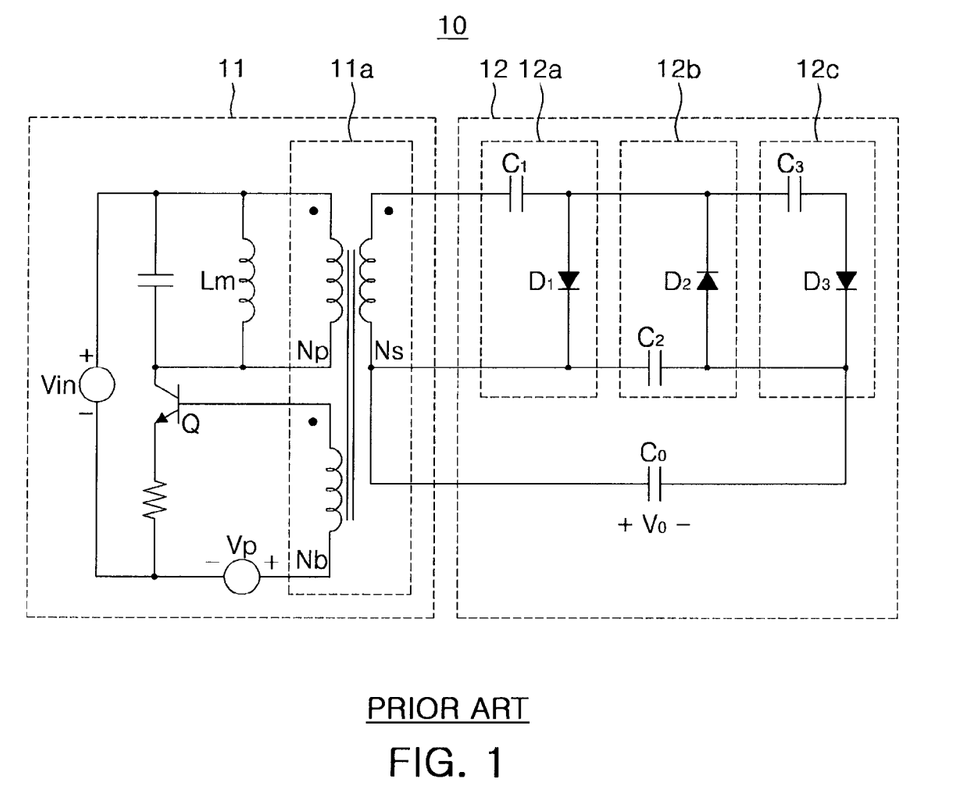
FIG. 1 is a configuration view illustrating a conventional high voltage power supply; conventional high voltage power supply.

FIG. 1 is a configuration view illustrating a conventional high voltage power supply.

Referring to FIG. 1, the conventional high voltage power supply 10 includes a power converter 11 converting a voltage level of an input direct current (DC) power according to a preset turn ratio, and a multiplier 12 multiplying a DC voltage level converted from the power converter 11.

In the conventional high voltage power supply 10, the current converter 11 employs a power converting high voltage transformer 11a having primary and secondary windings Np, Ns and an accessory winding Nb wound around a magnetic device to multiply a high voltage DC power. Also, multiplying cells 12a, 12b, and 12c including diodes D1, D2, and D3 and capacitors C1, C2, and C3, respectively receive the high voltage DC power to multiply at a preset ratio.

In the conventional high voltage power supply 10, the voltage level of the high voltage DC power from the power converter 11 is applied to the diodes D1, D2, and D3 of the multiplying cells 12a, 12b, and 12c and the capacitors C1, C2, and C3, respectively.

Accordingly, the conventional high voltage power supply 10 needs to employ high voltage devices with high withstanding voltages in the respective multiplying cells 12a, 12b, and 12c, thereby increasing manufacturing costs. As described above, since the power converter 11 utilizes a current converting high voltage transformer 11a to enable the primary and secondary windings Np and Ns and the accessory winding Nb to be wound around a magnetic device, the number of turns of the primary, secondary, and accessory windings Np, Ns, and Nb and the winding method are complicated when the high voltage DC power is outputted, which accordingly leads to an increase in the bulk and size of the magnetic device.

SUMMARY OF THE INVENTION

An aspect of the present invention provides a high voltage power supply capable of reducing voltage stress of a voltage multiplying device and supplying a voltage applied to an inductor as a bias voltage of a switching device according to a turn ratio without employing a power converting transformer.

An aspect of the present invention also provides a high voltage power supply including: a power converter switching on/off and converting an input direct current power into a direct current power having a preset voltage level; and a voltage multiplier including a first multiplying cell multiplying the voltage level of the direct current power from the power converter, wherein the first multiplying cell includes: first and second capacitors charging the direct current power from the power converter, respectively; a first diode providing a path for transferring the direct current power when the power converter is switched off; and a second diode providing a path for transferring the direct current power when the power converter is switched on.

The first diode of the first multiplying cell may include a cathode electrically connected to the power converter and an anode electrically connected to the second diode.

The second diode may include a cathode electrically connected to the first diode and an anode electrically connected to the second capacitor, the first capacitor has one end electrically connected to a junction between the first and second diodes and another end electrically connected to an input direct current power terminal, and the second capacitor has one end electrically connected to the cathode of the first diode and another end electrically connected to the anode of the second diode.

The high voltage power supply may further include an output stabilizer stabilizing an output direct current power from the voltage multiplier.

The voltage multiplier may further include at least another multiplying cell electrically connected in series between the first multiplying cell and the output stabilizer, wherein the at least another multiplying cell includes: a pair of charging capacitors charging the direct current power of the power converter, respectively; a switching off path diode providing a path for transferring the direct current power when the power converter is switched off; and a switching on path diode providing a path for transferring the direct current power when the power converter is switched on.

The output stabilizer may include: an output diode providing a path for transferring the output direct current power from the voltage multiplier; and an output capacitor charging the output direct current power from the voltage multiplier.

The output direct current power may include the input direct current power having a polarity inversed.

The power converter may convert the input direct current power into a switching bias power according to a preset turn ratio, and switch on the input direct current power in response to the switching bias power and convert the voltage level of the direct current power.

The power converter may include: a switch switching on the input direct current power; a first inductor having a preset number of turns and charging energy of the input direct current power; and a second inductor having a preset number of turns and supplying the switching bias power to the switch according to the turn ratio with respect to the first inductor.

The high voltage power supply may further include a protective circuit blocking an overvoltage higher than a preset voltage level from being applied between an emitter and a base of the switch.

The power converter may further include a current source supplying the switching bias power to the switch during initial driving.

The high voltage power supply may further include a stabilizer stabilizing an output power from the voltage multiplier, wherein the stabilizer provides a path for transferring the output power; and a capacitor charging the output power.

The power converter may operate in a current continuous conduction mode.

The power converter may operate in a current discontinuous conduction mode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT be described in detail with reference to the accompanying drawings.

Figure 2:
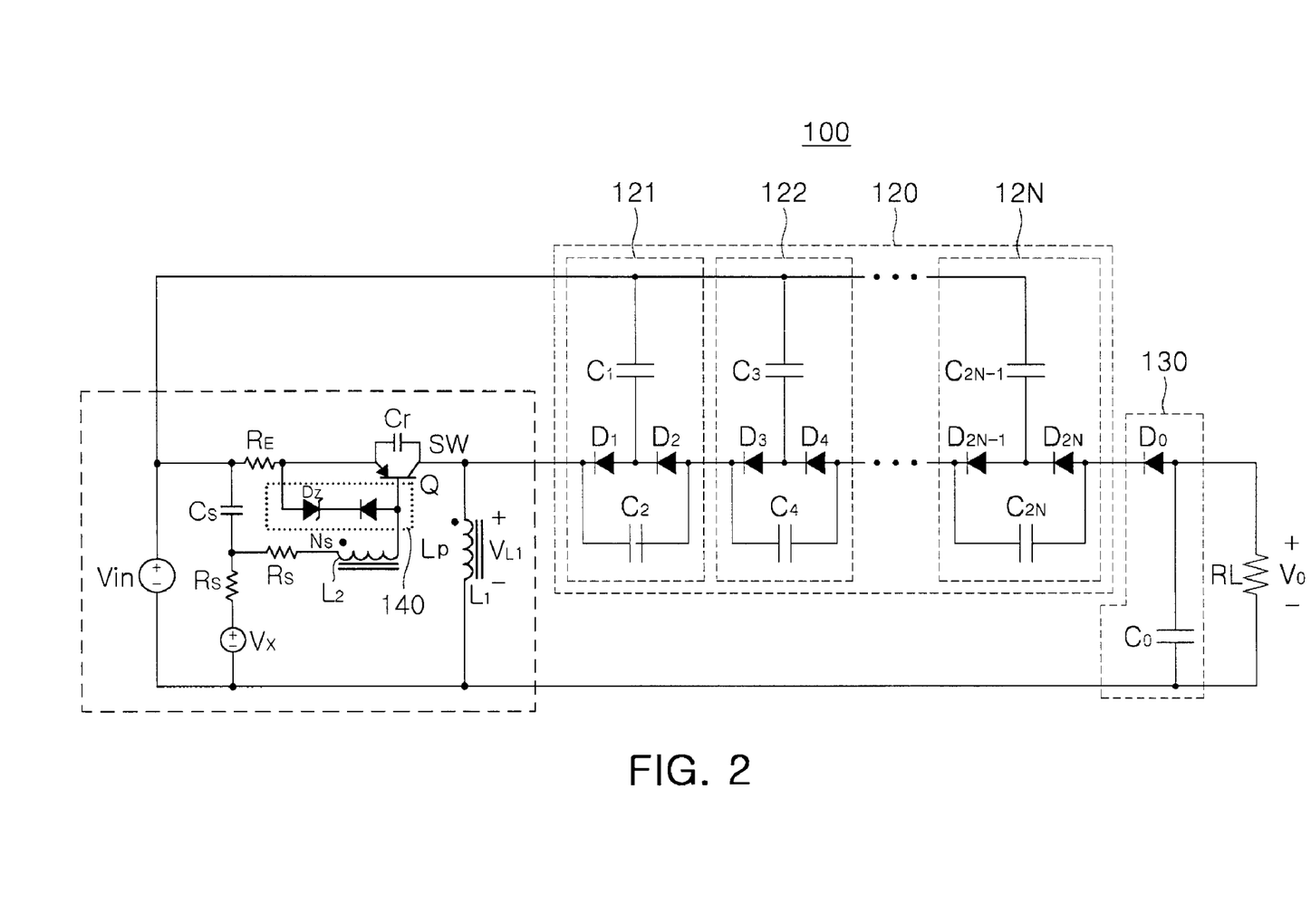
FIG. 2 is a configuration view illustrating a high voltage power supply according to an exemplary embodiment of the invention.

FIG. 2 is a configuration view illustrating a high voltage power supplier according to an exemplary embodiment of the invention.

Referring to FIG. 2, the high voltage power supply 100 includes a power converter 110, a voltage multiplier 120 and an output stabilizer 130.

The power converter 110 switches on/off and converts an input direct current (DC) power Vin into a DC power having a preset voltage level. This power converter 110 may adopt various configurations such as a current source or a power converting transformer. In the present embodiment, the power converter 110 includes a switch Q connected to an input DC power Vin terminal, a first inductor L1 receiving a power switched from the switch Q, and a second inductor L2 receiving energy from the first inductor L1 and supplying a switching bias power to the switch Q.

The switch Q can be configured as a PNP transistor including an emitter receiving the input DC power Vin, a base receiving the switching bias power and a collector outputting the switched on/off DC power.

The first inductor L1 has a preset number of turns, and charges and discharges the DC power switched on/off by the switch Q.

The second inductor L2 has a preset number of turns, and supplies the DC power from the first inductor to the base of the switch Q as the switching bias voltage according to a turn ratio with respect to the first inductor L1.

Moreover, the power converter 110 may further include a current source Vx supplying a switching bias power when initially operated.

Figure 3A:
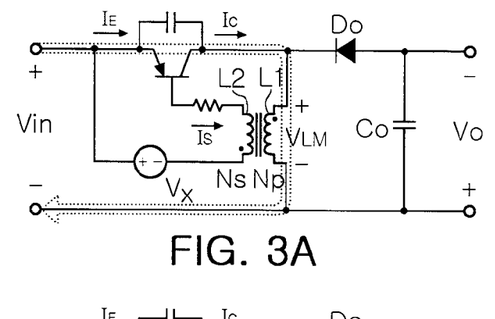
FIG. 3A to 3F illustrates operation of a power converter employed in a high voltage power supply according to an exemplary embodiment of the invention.
Figures 3B, 3C:
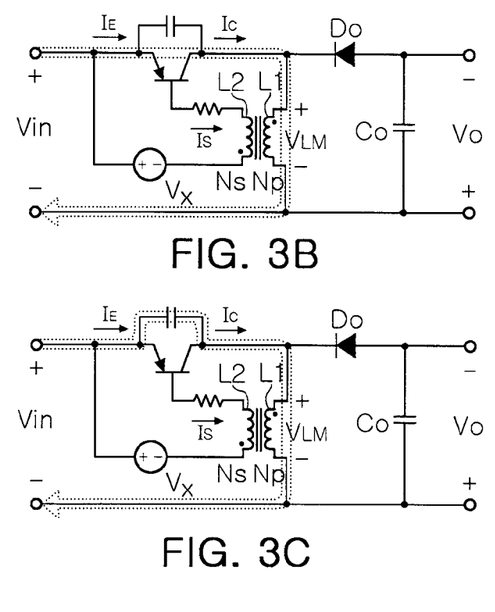
Figures 3D, 3E, 3F:
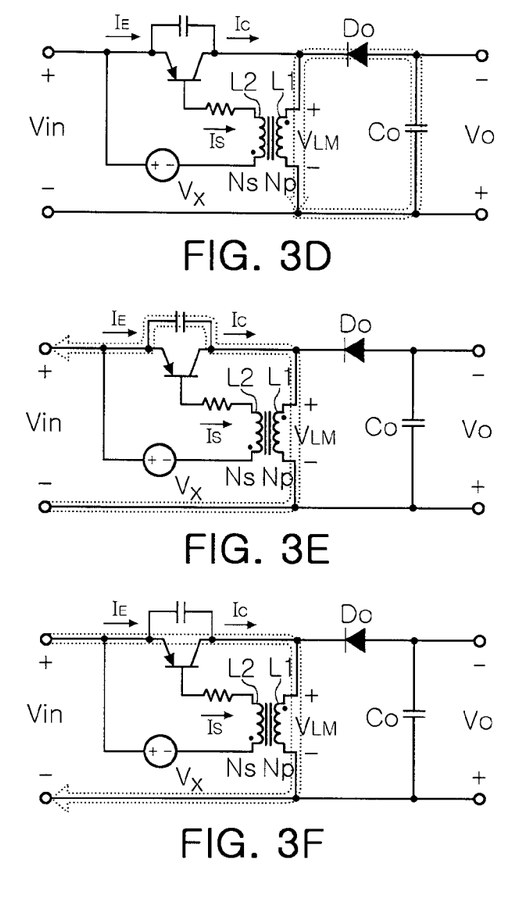
Figure 4:
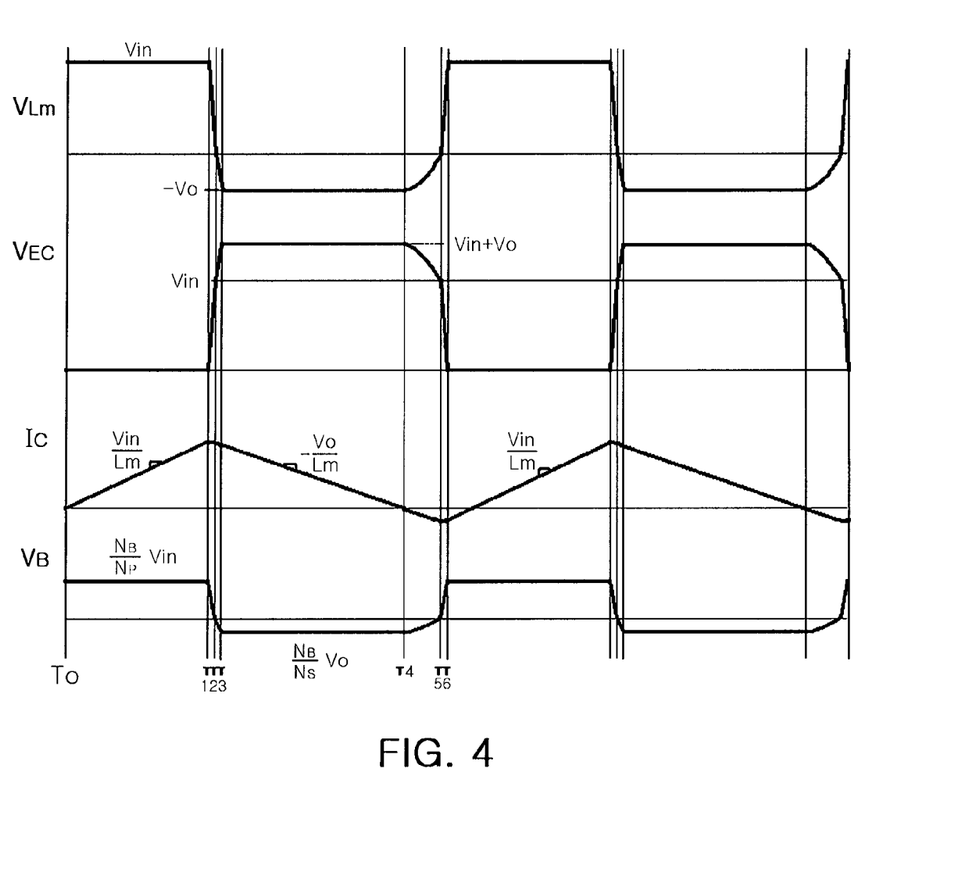
FIG. 4 is a waveform diagram of major signals of a power converter employed in a high voltage power supply according to an exemplary embodiment of the invention.

FIG. 3 illustrates operation of a power converter employed in a high voltage power supply according to an exemplary embodiment of the invention. FIG. 4 is a waveform diagram of major signals of a power converter employed in a high voltage power supply according to an exemplary embodiment of the invention.

Referring to FIG. 3, the operation of the power converter employed in the high voltage power of the present invention will be described except for the voltage multiplier 120.

Referring to FIGS. 3 and 4, as shown in FIG. 3A, when the switch Q is switched on, a current path occurs as indicated with a dotted arrow, and thus the input DC voltage Vin is applied as a both-end voltage $V_{L1}$ of the first inductor L1. A voltage Ns/Np*Vin is combined with a voltage of the current source Vx in the second inductor L2 according to a turn ratio with respect to the first inductor L1 and then is supplied as a voltage $V_{EC}$ between the emitter and base of the switch Q to turn on the switch Q continuously. This allows a base Ib current to flow. At this time, a collector current Ic of the switch Q, i.e., current flowing to the first inductor L1 is increased with an inclination of Vin/L1 (see an internal T0 to T1 of FIG. 4).

Next, with the collector current Ic of the switch Q gradually increasing, the switch Q in stable operation enters a saturation region (see an interval T1 and T2 of FIG. 3B and FIG. 4). This increases a voltage $V_{EC}$ between the emitter and collector of the switch Q. With an increase in the voltage $V_{EC}$ between the emitter and collector of the switch Q, the voltage $V_{L1}$ applied to both ends of the first inductor L1 is decreased commensurately since the switch Q is on the same current path as the first inductor as illustrated. With a decrease in the voltage $V_{L1}$ applied to the both ends of the first inductor L1, a voltage Vb between the emitter and base of the switch Q is decreased and the base current Ib is decreased, thus allowing the switch Q to be switched off. When the voltage $V_{L1}$ applied to the both ends of the first inductor L1 is 0V, the first inductor L1 and the capacitor Cr resonate (see an interval T2 to T3 of FIG. 3C and FIG. 4).

Subsequently, the voltage $V_{L1}$ applied to the both ends of the first inductor L1 drops to −Vo, an output diode Do of the stabilizer 130 is in an ON state and thus energy stored in the first inductor L1 is released to an output side (see an interval T3 to T4 of FIG. 3D and FIG. 4).

Thereafter, with the energy of the first inductor L1 released completely, that is, the first inductor current $I_{L1}$ becomes 0, the capacitor Cr and the first inductor L1 resonate again, thus decreasing the voltage $V_{EC}$ between the emitter and collector of the switch Q. Accordingly, this increases the both-end voltage $V_{L1}$ of the first inductor L1 (see an interval T4 and T5 of FIG. 3E and FIG. 4).

Finally, when the both-end voltage $V_{L1}$ of the first inductor L1 rises to 0V or higher, the switching bias power is supplied to the switch Q through the second inductor L2 according to a turn ratio with respect to the first inductor L1. This allows the switch Q to be switched on (see an interval T5 and T6 of FIG. 3F and FIG. 4).

As described above, the power converter 110 employed in the high voltage power supply of the present embodiment receives the both-end voltage of the first inductor L1 according to a turn ratio to be applied between the emitter and base of the switch Q, thereby self-oscillating. The high voltage power supply of the present embodiment employs the inductors, in place of a high voltage transformer for generating a high voltage DC power as in the conventional high voltage power supply. Accordingly, this reduces the size and price of the magnetic device and precludes a need for complicated windings for generating a high voltage, thereby ensuring more reliable products.

Referring back to FIG. 2, the voltage multiplier 120 employed in the high voltage power supply 100 of the present embodiment may include at least one multiplying cell. The voltage multiplier 120 may include a plurality of multiplying cells according to a desired multiplying ratio.

The multiplying cells 121 to 12N of the voltage multiplier 120 each include respective two capacitors C1 to C2N and respective two diodes D1 to D2N.

For example, in the case of a first multiplying cell 121, a first diode D1 includes a cathode electrically connected to the first inductor L1 and an anode electrically connected to a second diode D2. A second diode D2 includes a cathode electrically connected to the anode of the first diode D1 and an anode electrically connected to the second capacitor C2. A first capacitor C1 has one end electrically connected to a junction between the first and second diodes D1 and D2 and another end electrically connected to the input DC power Vin terminal. A second capacitor C2 has one end electrically connected to the cathode of the first diode D1 and another end electrically connected to the anode of the second diode D2.

In a case where the voltage multiplier 120 includes a plurality of multiplying cells, the second and Nth multiplying cells 122 to 12N may be connected in series between the first multiplying cell 121 and the output stabilizer 130.

The second and Nth multiplying cells 122 and 12N include 2N-1 and 2N capacitors C3 and C2N, respectively and 2N-1 and 2N diodes D3 and D2N, respectively, where N is a natural number of at least two. In the second multiplying cell 122, a third diode D3 includes a cathode electrically connected to the anode of the second diode D2 of the first multiplying cell 121 and an anode electrically connected to a fourth diode D4. The fourth diode D4 includes a cathode electrically connected to the anode of the third diode D3 and an anode electrically connected to a fourth capacitor C4 and the following multiplying cell. A third capacitor C3 has one end electrically connected to a junction between the third and fourth diodes D3 and D4 and another end electrically connected to the input DC power Vin terminal. A fourth capacitor C4 has one end electrically connected to the cathode of the third diode D3 and another end electrically connected to the anode of the fourth diode D4. In the same manner as described above, a third multiplying cell (not shown) to an Nth multiplying cell 12N may be connected in series between the second multiplying cell and the output stabilizer 130. Also, as described above, the third multiplying cell to the Nth multiplying cell 12N may include 2N-1 and 2M diodes, respectively and 2N-1 and 2N capacitors, respectively, where N is a natural number of at least 3.

The multiplying cells 121 to 12N can multiply the converted DC power from the power converter 110 according to a preset amplifying ratio. For example, in a case where the voltage multiplier 120 includes the first multiplying cell 121, the converted DC power can have a voltage level multiplied two times. In a case where the voltage multiplier 120 includes the first and second multiplying cells 121 and 122, the converted DC power can have a voltage level multiplied three times. In this fashion, when the voltage multiplier 120 includes first to Nth multiplying cell 121 to 12N, the converted DC power can have a voltage level multiplied by N+1 times, where N is a natural number of at least two.

The output stabilizer 130 includes an output capacitor Co and an output diode Do. The output diode Do provides a cycle path of an output DC power Vo from the voltage multiplier 120. The output capacitor Do charges the output DC power Vo to supply to a load RL. Here, the output DC power Vo has a polarity that is an inversed polarity of the input DC power Vin.

The high voltage power supply 100 of the present embodiment may further include a protective circuit 140 protecting a switch Q of the power converter 110 from an overvoltage.

The protective circuit 140 protects the switch Q from being damaged in a case where the switching bias voltage supplied from the current source Vx during initial operation or the switching bias voltage from the second inductor L2 has a voltage level higher than a preset voltage level. To this end, a zenor diode Dz may be electrically connected between the emitter and base of the switch Q.

The power converter 110 can be operated in a current continuous mode or current discontinuous mode. Hereinafter, the high voltage power supply 100 of the present embodiment will be described in detail according to the operation mode of the power converter 110.

Figure 5A:
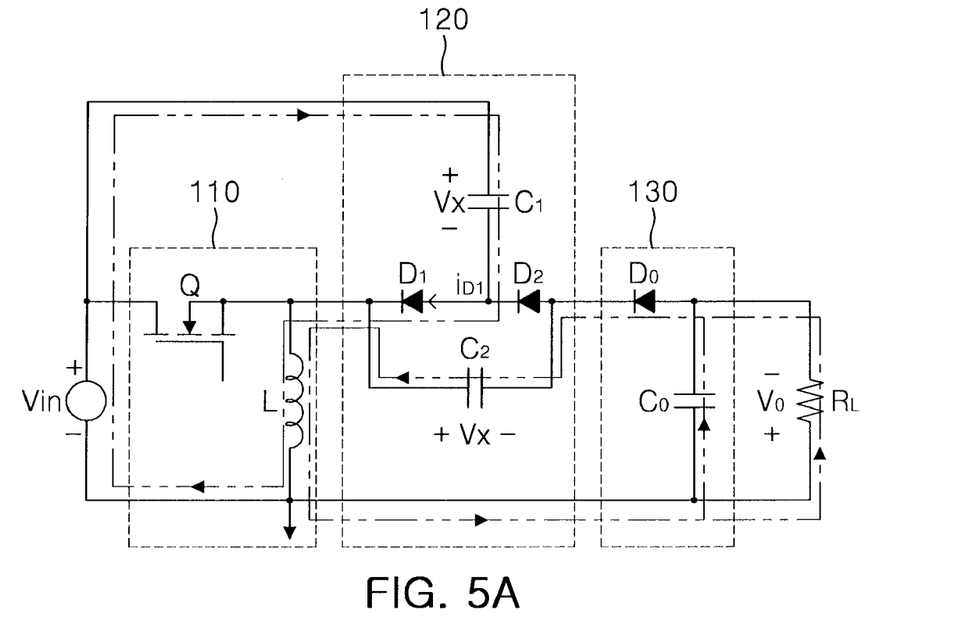
FIGS. 5A and B sequentially illustrate voltage multiplication of a high voltage power supply operating in a current continuous mode.
Figure 5B:
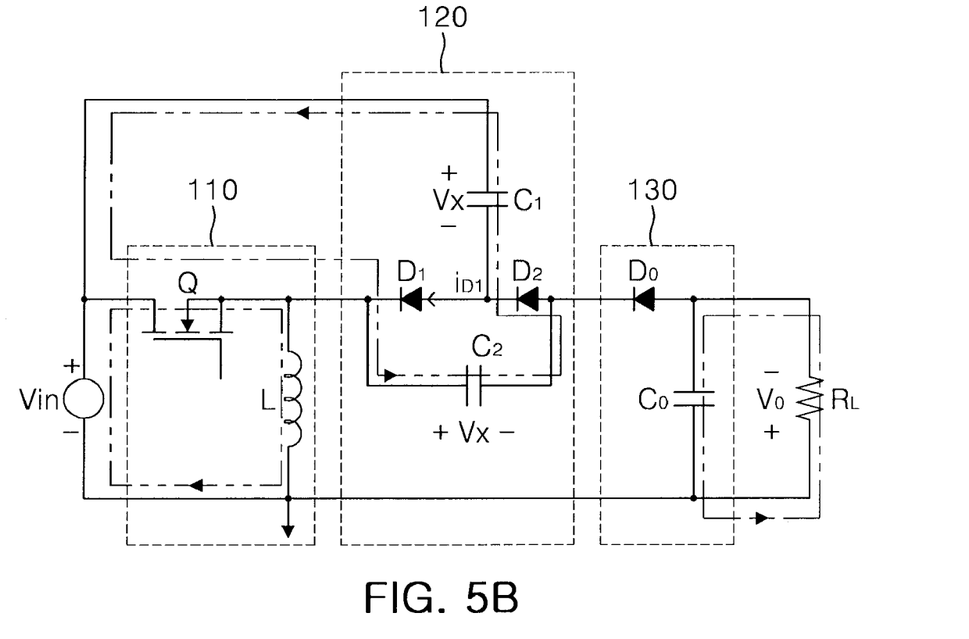
Figure 6:
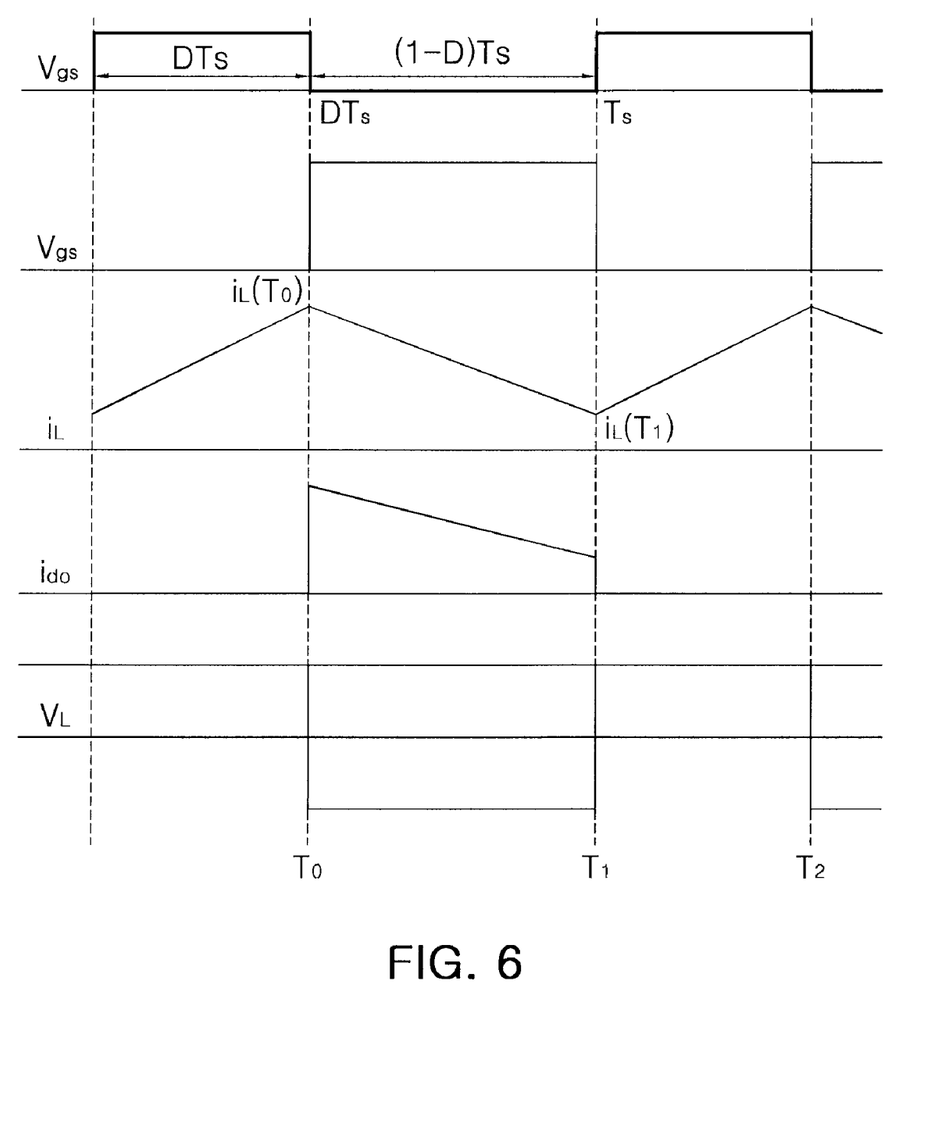
FIG. 6 is an operational waveform diagram of the high voltage power supply shown in FIG. 5.

FIGS. 5A and B sequentially illustrate voltage multiplication of a high voltage power supply operating in a current continuous mode. FIG. 6 is an operational waveform diagram illustrating the high voltage power supply shown in FIG. 5.

Referring to FIGS. 5 and 6, the power converter 110 employed in the high voltage power supply 100 of the present embodiment can operate in a current continuous conduction mode (CCM). Moreover, for the convenient description of the operation, the voltage multiplier 120 is assumed to include the first multiplying cell 121 and the power converter 110 has only portions of elements illustrated to describe voltage multiplication of the voltage multiplier 120.

When the switch Q is turned off at t=T0, the first diode D1 and the output diode Do are in an ON state and energy stored in the first inductor L1 is discharged through a path defined by the first inductor L1—the input DC power terminal Vin—the first capacitor C1—the first diode D1, and through a path defined by the first inductor L1—the output capacitor C0—the output diode D0—the second diode D2. Therefore, a current $i_L(t)$ flowing in the first inductor L1 is expressed as following Equation 1;

$$i_L(t) = i_L(T_0) + \frac{V_{in} - V_x}{L}(t - T_0) \qquad \text{Equation 1}$$
$$= i_L(T_0) + \frac{V_x - V_0}{L}(t - T_0,$$

Accordingly, a current $i_L(T1)$ at t=T1 is expressed as following Equation 2;

$$i_L(T_1) = i_L(T_0) + \frac{V_{in} - V_x}{L}(1 - D)T_s \qquad \text{Equation 2}$$
$$= i_L(T_0) + \frac{V_x - V_0}{L}(1 -,$$

where D is a duty ratio of on/off of the switch Q and Ts is a switching frequency.

In the operation interval described above, Vx is applied as an inverse voltage of the second diode D2 and a drain-to-source voltage Vds of the switch Q, respectively.

Next, when the switch Q in an ON state at t=T1, the first diode D1 and the output diode Do are in an OFF state and the second diode D2 is in an ON state. Energy is stored in the first inductor L1 through a path defined by the input DC power terminal Vin—the switch Q—the first inductor L1. Therefore, the current $i_L(t)$ flowing through the first inductor L1 is expressed as following Equation 3;

$$i_L(t) = i_L(T_1) + \frac{V_{in}}{L}(t - T_1),\quad \text{Equation 3}$$

Accordingly, a current $i_L(T2)$ at t=T2 is expressed as following Equation 4, $$i_L(T_2) = i_L(T_1) + \frac{V_{in}}{L}DT_s\quad \text{Equation 4}$$
$$= i_L(T_0),$$

In the operation interval described above, when the second diode D2 is in an ON state, a path defined by the capacitor C1—the switch Q—the second capacitor C2—the second diode D2 is formed, and both-end voltages of the first and second capacitors C1 and C2 are Vx, respectively. Vx is applied as the inverse voltage of the first diode D1 and Vin+Vo−Vx is applied as the inverse voltage of the output diode Do. When the switch Q is in an OFF state at t=T2, the operation mode in this interval ends and operations in the interval T0 to T2 are repeated periodically.

When the Equations 2 and 4 are combined, the voltage Vx applied to both ends of the first and second capacitors C1 and C2 is calculated according to following Equation 5 and an input/output voltage conversion ratio Vo/Vin is calculated according to following Equation 6, $$V_x = \frac{V_{in}}{1 - D},\quad \text{Equation 5}$$

$$\frac{V_o}{V_{in}} = \frac{1 + D}{1 - D},\quad \text{Equation 6}$$

Here, the duty ratio D ranges from 0 to 1, and thus Vin<Vx<Vo is satisfied. Accordingly, the input/output voltage conversion ratio is expressed as following Equation 7;

$$\left.\frac{V_o}{V_{in}}\right|_{CCM} = \frac{N-1}{1-D} + \frac{D}{1-D},\quad \text{Equation 7}$$

where D is a duty ratio of on/off of the switch Q and N is a multiplying integer of the voltage multiplier 120. That is, when the voltage multiplier 120 includes the first multiplying cell 121, N becomes 2, and when the voltage multiplier 120 includes the first and second multiplying cells 121 and 122, N becomes 3.

Figure 7A:
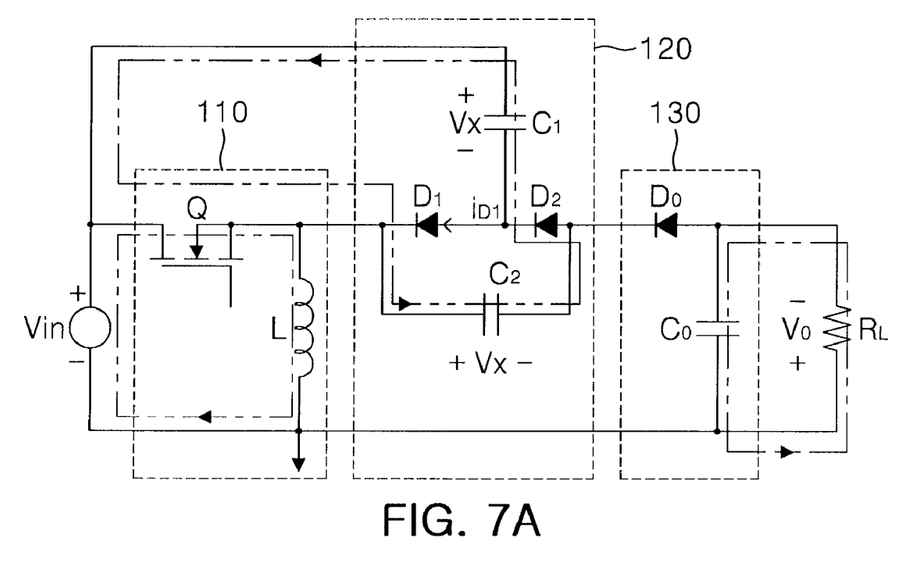
FIGS. 7A to 7C sequentially illustrate voltage multiplication of a high voltage power supply operating in a current discontinuous mode.
Figure 7B:
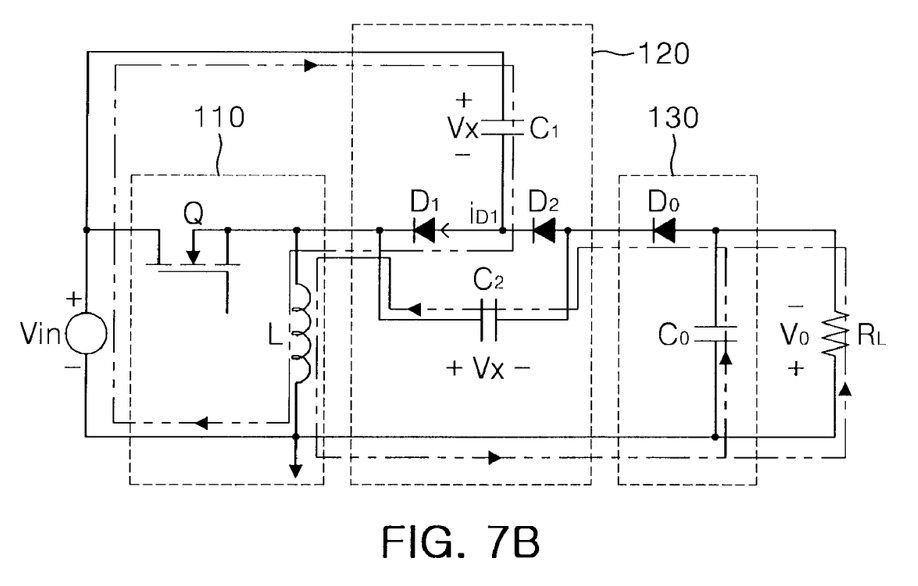
Figure 7C:
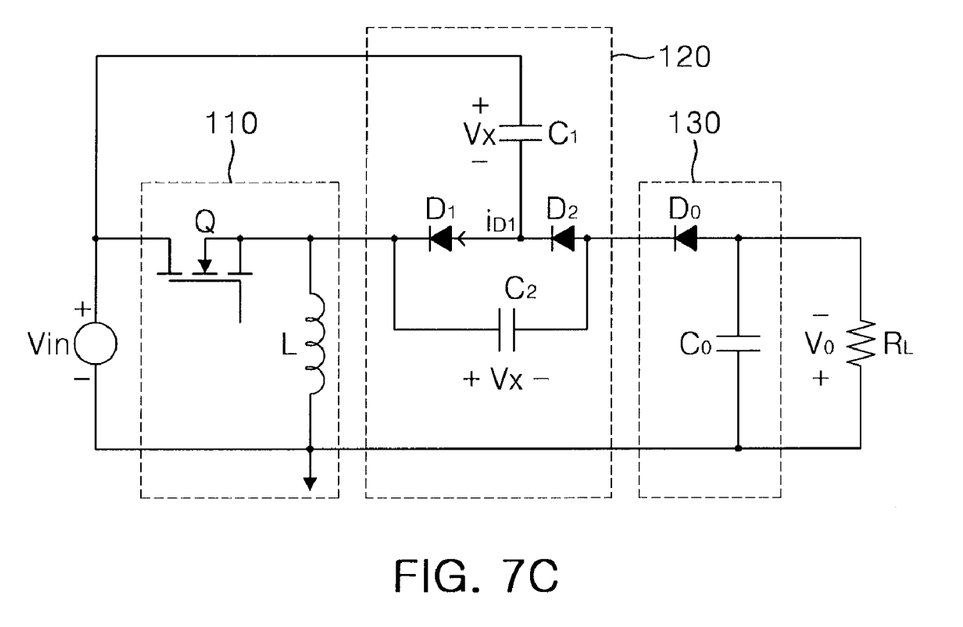
Figure 8:
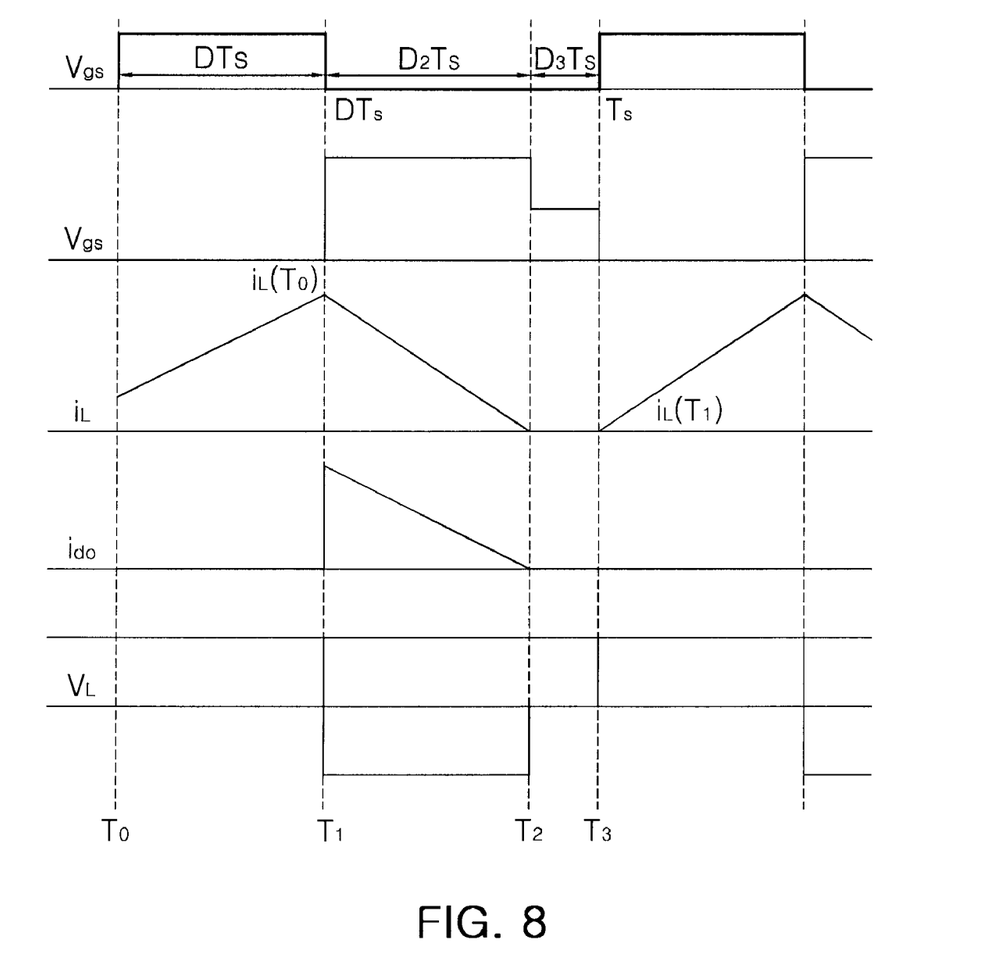
FIG. 8 is an operational waveform diagram of the high voltage power supply shown in FIG. 7.

FIGS. 7A to 7C sequentially illustrate voltage multiplication of a high voltage power supply operating in a current discontinuous mode. FIG. 8 is an operational waveform diagram of the high voltage power supply shown in FIG. 7.

Referring to FIGS. 7 and 8, the power converter 110 employed in the high voltage power supply 100 of the present embodiment can operate in a current discontinuous conduction mode (DCM).

When the switch Q is in an ON state at t=T0, the first diode D1 and the output diode Do are in an OFF state and the second diode D2 is in an ON state. Energy is stored in the first inductor L1 through a path defined by the input DC power terminal Vin—the switch Q—the first inductor L1. Therefore, the current $i_L(t)$ flowing through the first inductor L1 is expressed as following Equation 8, $$i_L(t) = \frac{V_{in}}{L}(t - T_0),\quad \text{Equation 8}$$

Accordingly, the current $i_L(T1)$ at t=T1 is expressed as following Equation 9, $$i_L(T_1) = \frac{V_{in}}{L}DT_s,\quad \text{Equation 9}$$

In the operation interval described above, when the second diode D2 is an ON state, a path defined by the first capacitor C1—the switch Q—the second capacitor C2—the second diode D2 is formed, and both-end voltages of the first and second capacitors C1 and C2 are Vx, respectively. Thus, Vx is applied as the inverse voltage of the first diode D1 and Vi+Vo−Vx is applied as the inverse voltage Vdo of the output diode.

When the switch is in an OFF state at t=T1, the first diode D1 and the output diode Do are in an ON state, and energy stored in the first inductor L1 is discharged through a path defined by the first inductor L1—the input DC power terminal Vin—the first capacitor C1—the first diode D1, and through a path defined by the first inductor L1—the output capacitor Co—the output diode Do—the second capacitor C2. Therefore, the current $i_L(T)$ flowing through the first inductor L1 is expressed as following Equation 10.

$$i_L(t) = i_L(T_1) + \frac{V_{in} - V_x}{L}(t - T_1)\quad \text{Equation 10}$$
$$= i_L(T_1) + \frac{V_x - V_o}{L}(t - T_1)$$

During the operation interval described above, Vx is applied as the inverse voltage of the second diode D2 and the drain-source voltage Vds of the switch Q, respectively. Accordingly, at t=T2, the current $i_L(T2)$ of the first inductor L1 becomes zero and following Equation 11 is satisfied according to the Equations 9 and 10.

$$DV_1 = D_2(V_N - V_{in}) = D_2(V_O - V_N)\quad \text{Equation 11,}$$

where D2 is defined as (T2−T1)/Ts.

At t=T2, all of the diodes are in an OFF state, and a both-end voltage of an inductive device L and the current flowing through the first inductor L1 become zero (0). During the operation interval described above, voltages of Vds (Q), VDo, VD1, and VD2 are Vi, Vo−Vx, Vx−Vi, and Vin, respectively. At t=T3, with the switch Q in an ON state, the operation mode in the interval T0 to T3 is repeated periodically.

A both-end voltage Vx of the first and second capacitors C1 and C2 and an input/output voltage conversion ratio Vo/Vin during the discontinuous conduction mode satisfy following Equations 12 and 13, respectively according to Equation 11.

$$V_x = \frac{D + D_2}{D_2} V_{in},$$ Equation 12

$$V_o = \frac{2D + D_2}{D_2} V_{in},$$ Equation 13

Referring to graphs of FIGS. 7 and 8, an output load current (Io) is a mean value of the current of the output diode (Do), and thus satisfies following Equation 14, $$I_o = \frac{V_o}{R_L} = \frac{D_2 i_L(T_1)}{4},$$ Equation 14

When the Equation 9 is applied to Equation 14, D2 can be obtained according to following Equation 15, $$D_2 = \frac{2K}{D} \cdot \frac{V_o}{V_{in}},$$ Equation 15 where K=2 L/(RLTs).

When Equation 15 is applied to Equation 13, an input/output voltage conversion ration Vo/Vin of a circuit of the present invention operating in the discontinuous conduction mode can be derived according to Equation 16;

$$\frac{V_o}{V_{in}} = \frac{1 + \sqrt{1 + \frac{4D^2}{K}}}{2},$$ Equation 16

Accordingly, the input/output voltage conversion ratio can be obtained according to following Equation 17;

$$\frac{V_o}{V_{in}}\bigg|_{DCM} = \frac{N - 1 + \sqrt{(N-1)^2 + 4D^2/K}}{2}$$ Equation 17

Electrical properties of the high voltage power supply of the present invention will be compared with those of the conventional high voltage power supply with reference to the Table below.

TABLE

|  | Conventional | Present invention |
|---|---|---|
| Input/output voltage conversion ratio | $M = \frac{3 - 2D^*}{1 - D^*}$ | $M = \frac{2 + D}{1 - D}$ |
| Duty ratio | $D^* = \frac{M - 3}{M - 2}$ | $D = \frac{M - 2}{M + 1}$ |
| Maximum inverse voltage of diode | $\frac{V_{in}}{1 - D^*}$ | $\frac{V_{in}}{1 - D}$ |
| Capacitor voltage | $V_{in}, \frac{V_{in}}{1 - D^*}, \frac{V_{in}}{1 - D^*} + V_{in}$ | $\frac{V_{in}}{1 - D}, \frac{2V_{in}}{1 - D}$ |
| Maximum drain-source voltage of switch | $V_{in} + \frac{D^*}{1 - D^*} V_{in}$ | $V_{in} + \frac{1}{1 - D} V_{in}$ |

In the Table noted above, as shown in FIG. 1, the conventional high voltage power supply was set to multiply the converted DC power three times. The high voltage power supply of the present invention was set to include the first and second voltage multiplying cells 121 and 122 to multiply the DC power three times as in the conventional high voltage power supply. Also, the input DC power Vin was set to 24V and the output DC power Vo was set to 1200V. The switching frequency was set to 50 KHz and an operation mode was set to the current continuous conduction mode.

Accordingly, the input/output voltage conversion ratio of the high voltage power supply of the conventional art and the present invention is set to 50, respectively. When the above voltage level is applied to Equations in the Table, the duty ratio of the conventional art and the present invention are set to 0.979 and 0.941, respectively.

In the conventional high voltage power supply, the maximum inverse voltage applied to each of the diodes D1, D2, and D3 is about 1152V. Meanwhile, the maximum inverse voltage applied to the first and second diodes D1, D2, D3, and D4 and the output diode Do of the present invention can be as low as 408V.

Moreover, in the conventional high voltage power supply, voltages of 24V, 1152V, and 1176V are applied to the capacitors C1, C2, and C3, respectively. On the other hand, in the present invention, a voltage of 408V is applied to the first and second capacitors C1 and C2 of the first multiplying cell 121 and the first capacitor C3 of the second multiplying cell 122, respectively and a voltage of 816V is applied to the second capacitor C4 of the second multiplying cell.

Furthermore, in the conventional high voltage power supply, a voltage of 1152V is applied to the switch Q. On the other hand, in the high voltage power supply of the present invention, a voltage of 432V is applied to the switch Q.

Figure 9:
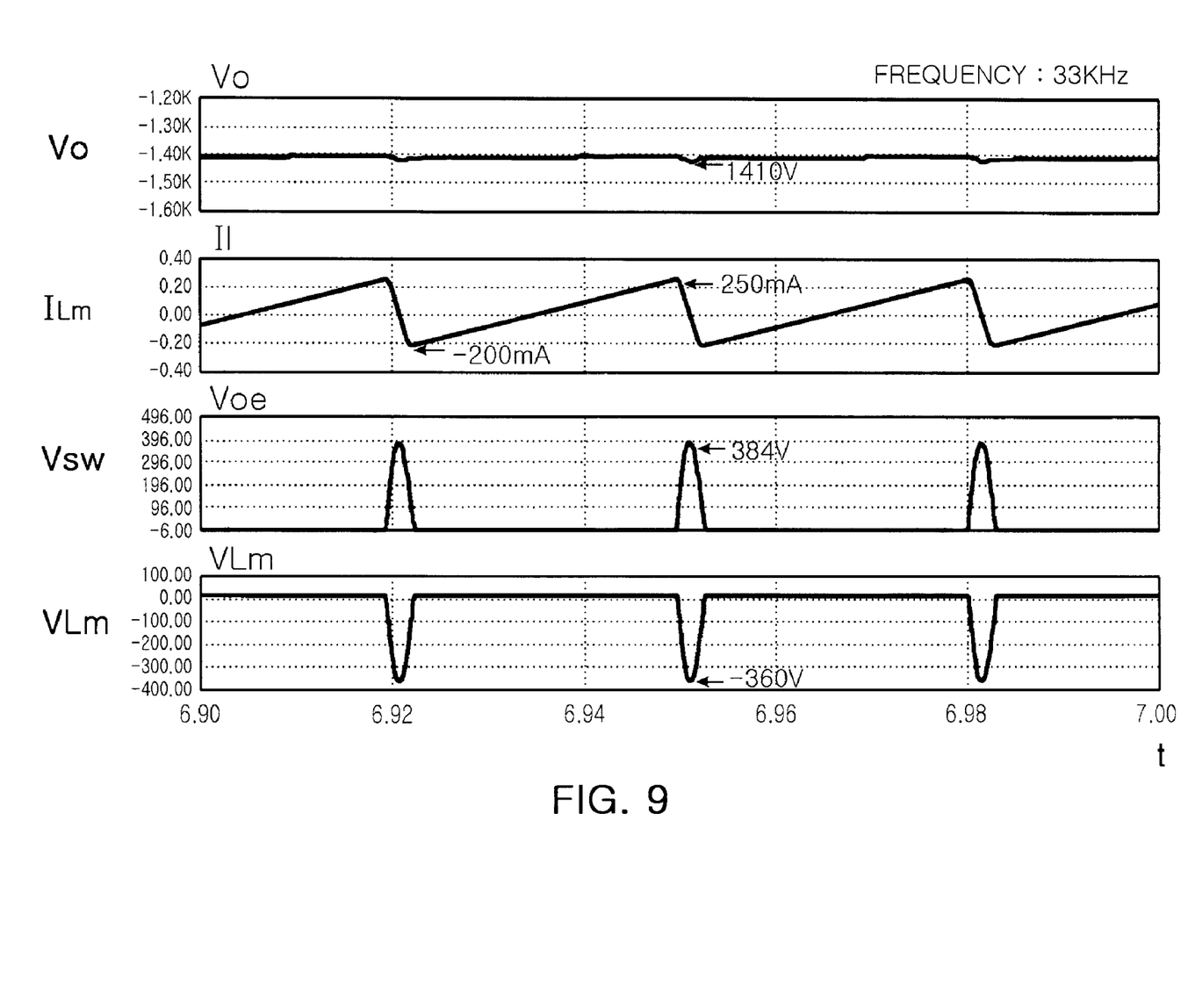
FIG. 9 is a simulation waveform diagram of a high voltage power supply according to an exemplary embodiment of the invention.

FIG. 9 is a simulation waveform diagram of a high voltage power supply according to an exemplary embodiment of the invention.

Referring to FIG. 9, the high voltage power supply of self oscillation according to the present embodiment includes the voltage multiplier 120 set to multiply the input DC power three times. When a voltage level of the DC power applied to the switch Q is about 384V and a voltage level of the DC power applied to the first inductor L1 is about −360V, the output DC power is −1410V according to a multiplying ratio of the voltage multiplier 120.

As described above, the voltage applied to each of devices employed in the high voltage power supply of the present embodiment is much lower compared with the conventional high voltage power supply. This may lead to a slight increase in the number of devices added, but devices with relatively low withstanding voltages may be adopted to reduce manufacturing costs over the conventional high voltage power supply.

As set forth above, according to exemplary embodiments of the invention, unlike a conventional high voltage power supply in which a converted DC power is applied to a diode regardless of switching on/off when a power is converted, a DC power is converted and applied through different paths according to switching on/off. Moreover, a power converting transformer is not employed and a voltage applied to an inductor is applied as a bias voltage of a switching device according to a turn ratio. As a result, the power is transferred by self oscillation to allow low voltage devices to be utilized, thereby reducing manufacturing costs.

While the present invention has been shown and described in connection with the exemplary embodiments, it will be apparent to those skilled in the art that modifications and variations can be made without departing from the spirit and scope of the invention as defined by the appended claims.

What is claimed is:

1. A high voltage power supply, comprising:
    a power converter switching on/off and converting an input direct current power into a direct current power having a preset voltage level; and
    a voltage multiplier comprising a first multiplying cell multiplying the voltage level of the direct current power from the power converter,
    wherein the first multiplying cell comprises:
        first and second capacitors charging the direct current power from the power converter, respectively;
        a first diode providing a path for transferring the direct current power when the power converter is switched off; and
        a second diode providing a path for transferring the direct current power when the power converter is switched on,
    wherein the first diode of the first multiplying cell comprises a cathode electrically connected to the power converter and an anode electrically connected to the second diode,
    the second diode comprises a cathode electrically connected to the first diode and an anode electrically connected to the second capacitor,
    the first capacitor has one end electrically connected to a junction between the first and second diodes and another end electrically connected to an input direct current power terminal, and
    the second capacitor has one end electrically connected to the cathode of the first diode and another end electrically connected to the anode of the second diode.

2. The high voltage power supply of claim 1, further comprising an output stabilizer stabilizing an output direct current power from the voltage multiplier.

3. The high voltage power supply of claim 2, wherein the voltage multiplier further comprises at least another multiplying cell electrically connected in series between the first multiplying cell and the output stabilizer,
    wherein the at least another multiplying cell comprises:
        a pair of charging capacitors charging the direct current power of the power converter, respectively;
        a switching off path diode providing a path for transferring the direct current power when the power converter is switched off; and
        a switching on path diode providing a path for transferring the direct current power when the power converter is switched on.

4. The high voltage power supply of claim 3, wherein the output stabilizer comprises:
    an output diode providing a path for transferring the output direct current power from the voltage multiplier; and
    an output capacitor charging the output direct current power from the voltage multiplier.

5. The high voltage power supply of claim 4, wherein the output direct current power comprises the input direct current power having a polarity inversed.

6. The high voltage power supply of claim 1, further comprising a stabilizer for stabilizing an output power from the voltage multiplier,
    wherein the stabilizer includes an output capacitor and an output diode;
    wherein the output diode provides a path for transferring the output power; the output capacitor for charging the output power.

7. The high voltage power supply of claim 1, wherein the power converter
    converts the input direct current power into a switching bias power according to a preset turn ratio,
    switches on the input direct current power in response to the switching bias power, and
    converts the voltage level of the direct current power.

8. The high voltage power supply of claim 7, wherein the power converter operates in a current continuous conduction mode.

9. The high voltage power supply of claim 7, wherein the power converter operates in a current discontinuous conduction mode.

10. The high voltage power supply of claim 7, wherein the power converter comprises:
    a switch for switching on the input direct current power;
    a first inductor having a first preset number of turns for charging energy of the input direct current power; and
    a second inductor having a second preset number of turns for supplying the switching bias power to the switch according to the preset turn ratio with respect to the first inductor.

11. The high voltage power supply of claim 10, further-comprising a protective circuit blocking an overvoltage higher than a preset voltage level from being applied between an emitter and a base of the switch.

12. The high voltage power supply of claim 10, wherein the power converter further comprises a current source for supplying the switching bias power to the switch during initial driving.

* * * * *